Aug. 7, 1945.   J. A. GAMMEL   2,381,045
TONGS
Filed April 14, 1944   3 Sheets-Sheet 1

INVENTOR.
JOHN A GAMMEL
BY
Cook & Robinson
ATTORNEYS

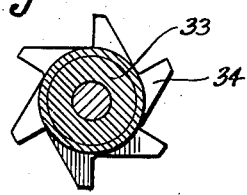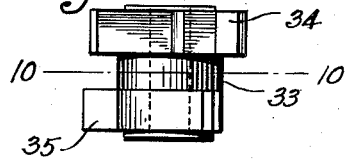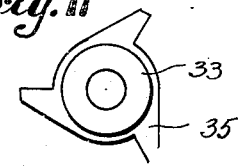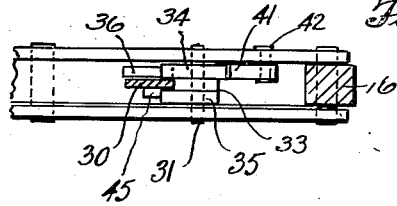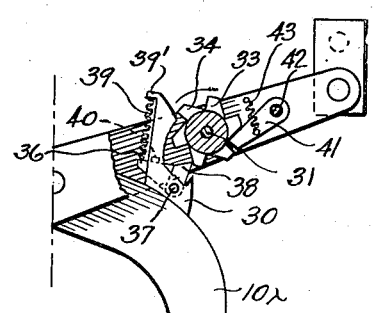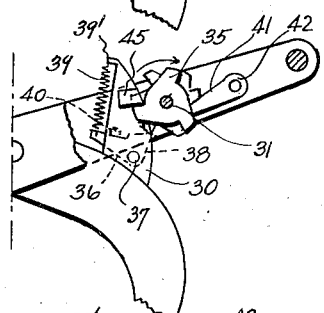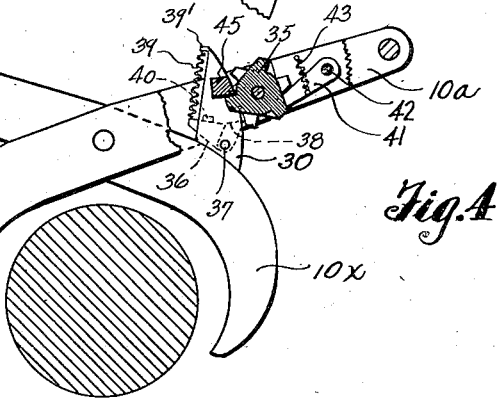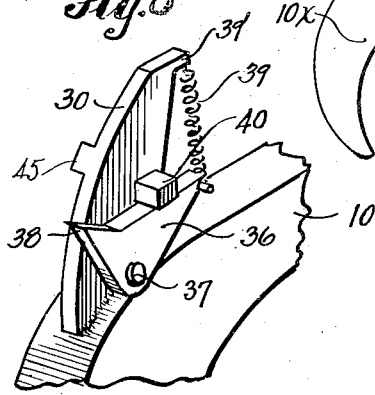

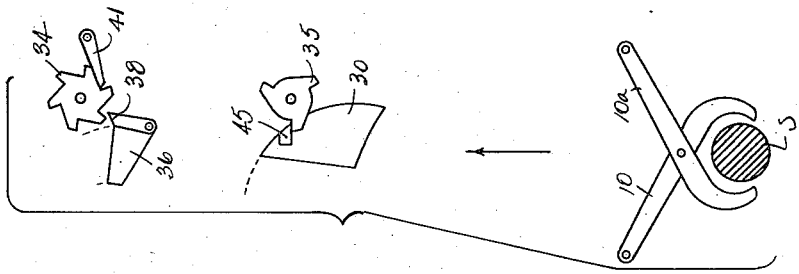
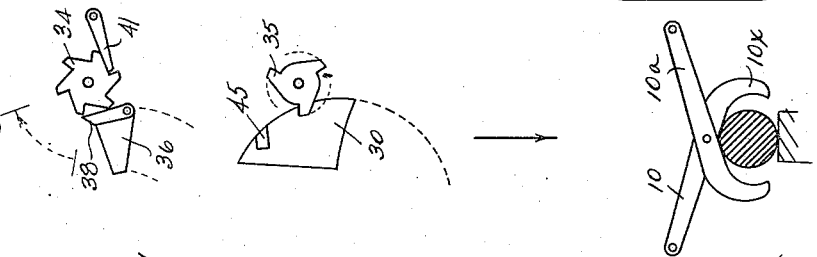
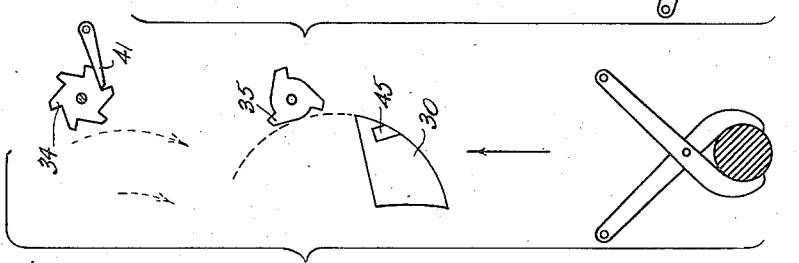
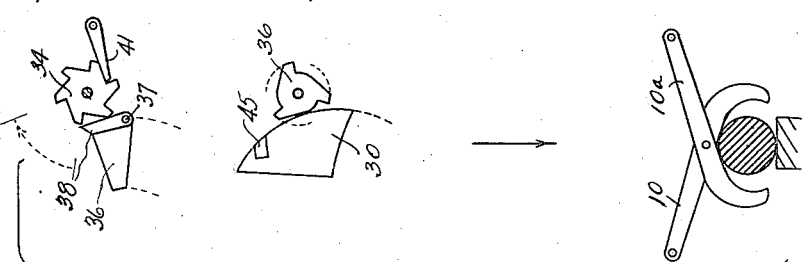
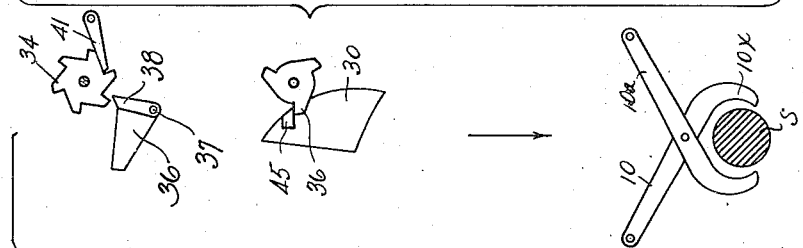

Patented Aug. 7, 1945

2,381,045

UNITED STATES PATENT OFFICE 2,381,045

TONGS

John A. Gammel, Seattle, Wash., assignor to Isaacson Iron Works, Seattle, Wash., a corporation of Washington Application April 14, 1944, Serial No. 531,019

5 Claims. (Cl. 294—110)

This invention relates to tongs and it has reference more particularly to improvements in tongs of those kinds designed to lift extremely heavy shafts or ingots; for example, a pair of tongs suitable for handling metal shafts of from eight to eighteen inches in diameter and from eight to sixteen feet long and weighing many tons.

For better understanding of the present invention, it will here be explained that it is a usual thing at this time to handle large, heavy hot shafts and hot ingots by means of tongs that are somewhat similar in construction and mode of use to those embodied by the present invention. Present-day tongs usually comprise two sets of jaw levers suspended by suitable linkage and a cable operating over sheave blocks from a traveling crane or carrier. Each set of jaw levers are crossed and pivotally joined, and are equipped at their lower ends with coacting hook shaped jaws designed to be opened apart to receive the horizontally disposed shaft or ingot between them, then, incident to being lifted, to be closed together by reason of the weight and due to the character and connection of the linkage attached to their upper ends. Such jaws automatically retain their grip on the shaft so long as it is held in suspension thereby. When the shaft as thus held by the tongs, is lowered onto a support, and the tongs are then lowered an additional distance after the shaft has come to rest, the weight of the linkage attached to the upper ends of the jaw levers operates to open the jaws fully apart. Heretofore, it has been necessary to manually lock the sets of jaws in their opened apart position in order to keep them from automatically closing together again when it is desired to lift the open tongs clear of the deposited shaft. When the open tongs are locked in open position, they may be lifted in the clear of the released shaft and they may be lowered onto another shaft. However, it is required that they be unlocked in order that they may then be closed about the shaft to pick it up.

In view of the work involved, the difficulty encountered when red hot shafts are being handled, and the time wasted in the operations of manually releasing or locking the tongs for the operations of picking up and placing the tongs in position, it has been the principal object of this invention to provide novel means in combination with the sets of tong levers whereby the locking and releasing of jaws is automatically accomplished through the raising and lowering of the tongs from and against the shaft or other object that is to be handled.

More specifically stated, it is the object of this invention to provide a set of lifting tongs, equipped with automatic locking and release devices whereby an operation of completely opening the jaws apart after a shaft has been deposited thereby causes the devices to operate to retain the jaws in a partially open position so that they may be lifted clear of the deposited shaft and held in that partially open position permitting their being applied over another shaft. The invention provides further that the complete opening of the tongs after application over another shaft, will so actuate the automatic means that when the tongues are again lifted, the jaws will be permitted to close about the shaft to be lifted.

Still further objects of the present invention are to be found in the details of construction of parts of the automatic locking devices and in their mode of operation as will hereinafter be fully described.

In accomplishing these and other objects of the invention, I have provided the improved details of construction, the preferred forms of which are illustrated in the accompanying drawings, wherein—

Fig. 4 is a view in which a part of one of the jaw levers is broken away to better show the automatic locking devices.

Fig. 5 is a top view of a part of one of the jaw levers showing the locking devices as applied thereto.

Fig. 6 is a side view of the parts as seen in Fig. 5 with certain parts broken away for better illustration.

Fig. 7 is a similar view showing the automatic devices in position locking the jaws open.

Fig. 8 is a perspective view of the latch plate and latch dog thereon as applied to one of the jaw levers of the set of tongs.

Fig. 9 is a top view of the latch wheel or gear.

Fig. 10 is a cross section taken on line 10—10 in Fig. 9.

Fig. 11 is an end view of the gear.

Figs. 12 to 16 inclusive show the successive positions of the latch devices as actuated incident to lowering the open tongs onto a shaft, releasing the latch, closing the tongs to pick up the shaft, then depositing the shaft on a support and completely opening the jaws apart to lock them against closing and to permit them to be lifted in the clear of the deposited shaft and ready for application to another object.

Referring more in detail to the drawings—

Figure 1:
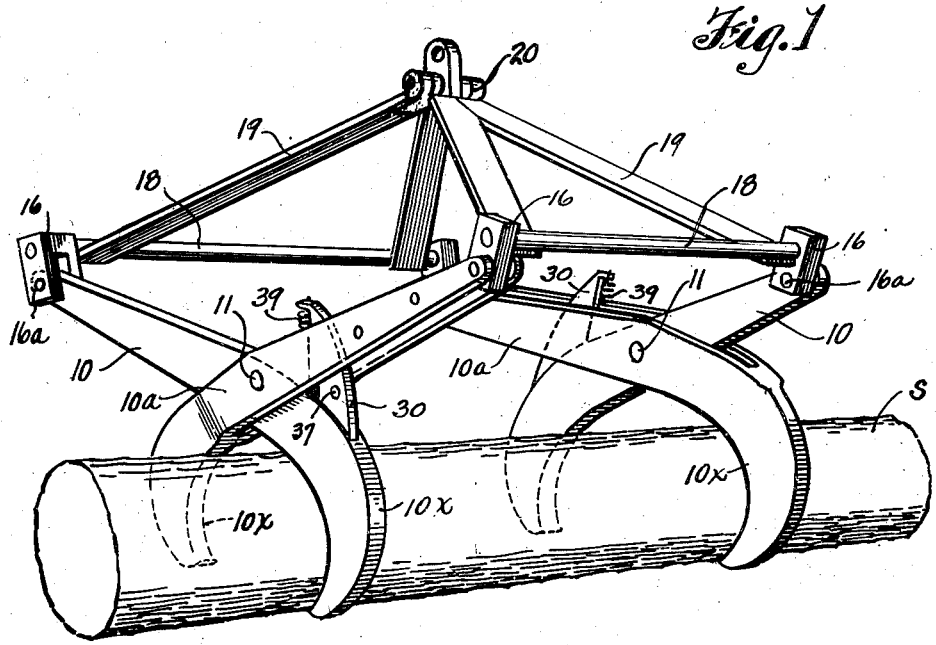
Fig. 1 is a perspective view of a set of tongs embodying the improvements of the present invention, the jaws thereof being shown in the partly open position in which they are locked when being lowered over a shaft that is to be picked up.
Figures 2, 3:
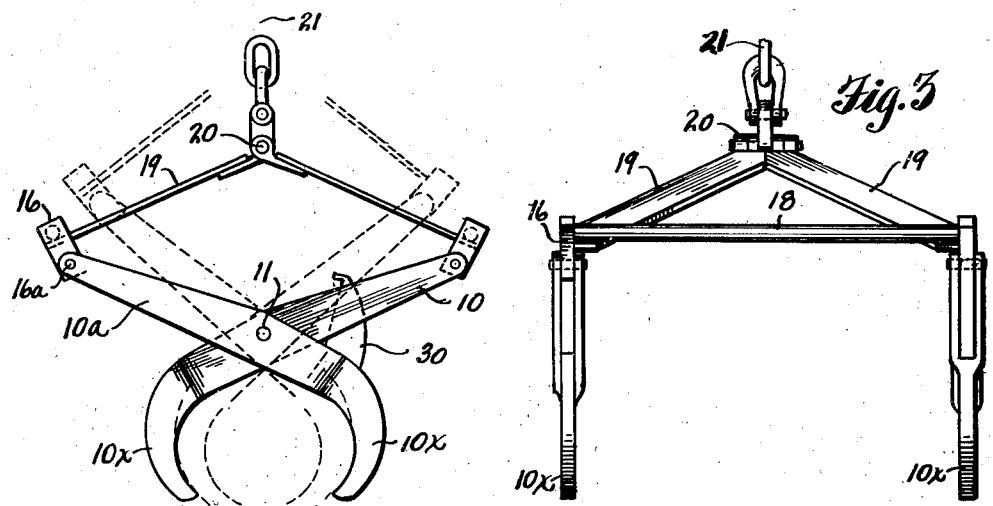
Fig. 2 is an end view of the set of tongs.
Fig. 3 is a side view of the same.

The present lifting tongs, as shown best in Fig. 1, comprise two sets of jaws, each jaw set comprising a pair of crossed levers 10 and 10a, that are pivotally joined in their crossed relationship by a pivot bolt 11. The two levers of each set of jaws are formed at their lower ends with hook shaped, cooperatively arranged jaw portions 10x adapted to be closed toward each other about the opposite sides of a bar or shaft S, as has been illustrated in Fig. 14, or to be opened apart as shown in Figs. 13 and 15 to release or deposit the shaft on a support. The lever 10a of each set of tongs is bifurcated from its upper or outer end to near the jaw portion, and the corresponding lever 10 is contained between these two portions and the assembled levers are secured pivotally together by the pivot bolt. The levers 10 and 10a of each set of jaws are substantially of the same length and at their outer ends, each is pivotally attached as at 16a to a block 16 and the blocks 16, at the ends of levers of the two sets of tongs that extend in the same direction are joined by horizontal bars or shafts 18 and these bars are attached, each by a pair of links or straps 19, to a central hinge member 20 to which a suspending cable 21 is attached.

It is to be understood that the two sets of jaws embodied in this device, as seen in Fig. 1, are raised and lowered as a unit by the cable 21. It is to be explained also that, considering the device as so far described, and without the present automatic locking devices applied thereto, the jaw portions of the two sets of tongs, due to their weight and manner of connection with the cable, would close together incident to lifting the device, and would be fully opened apart if lowered against a supported shaft after the fashion indicated in Fig. 13, but would not remain open so as to permit them to be lifted into the clear from one shaft and lowered over another.

The present automatic devices provided as a means for locking the jaws in open position, is shown best in Figs. 4 to 8 inclusive, wherein it is shown that a vertically disposed plate 30 is welded or otherwise fixed, to the top edge of the lever 10 of each jaw set near its jaw portion. Thus, for the set tongs as shown in Fig. 1, there are two of the automatic locking devices used. However, since each is like the other in construction and mode of use, only one will be described in detail and it will be understood that this description applies equally to both. The plate 30 extends upwardly and between the spaced side members of the bifurcated lever 10a and lies in the longitudinal planes of the two jaw levers.

Rotatably mounted on a cross axle or pin 31, that extends between the spaced side members of the lever arm 10a, is a latch gear or wheel 33, shown in top view in Fig. 9. At one end, this wheel body is formed with a six toothed ratchet 34 and at its other end has a three toothed oppositely facing ratchet 35. The ratchets 34 and 35 are spaced apart and their teeth lie, respectively in planes at opposite sides of the plate 30, which, as shown best in Fig. 4, has one vertical edge thereof arcuately curved about the axis of the pivot pin 11 as a center. Thus, in the opening and closing action of the jaw levers, the plate edge retains the same relationship to the gear.

On one side of the plate 30, as seen best in Fig. 8, a latch lever or pawl 36 is mounted by a pivot bolt 37. One end of this pawl lever is formed into an upwardly facing tooth 38 directed toward the outer end of lever 10a, adjacent the arcuate edge of plate 30 and adapted to engage with the teeth of the ratchet wheel 34 in the hinging or opening and closing actions of the jaws. The end of the latch lever 36 opposite the tooth 38 has one end of a spring 39 attached thereto and the spring is attached at its other end, under tension, to an extension 30' at the upper end of plate 30 to pull that end of the lever up against a stop lug 40 on the side of plate 30, thus to hold the tooth 38 in such position that in closing the jaws together, it will engage a tooth of the ratchet 34 to advance it one interval, that is, one sixth of a turn. With the closing actions of the set of jaws, this tooth yields and passes over the teeth of wheel 34 without causing any rotation thereof.

Also, as shown in Figs. 5 and 6, there is a latch pawl 41 pivoted between the two sides of lever 10a on a pivot pin 42 and this pawl is held by a coiled spring 43 up against the teeth of ratchet 34 to prevent the latch gear turning in a reverse direction, but permitting it to be advanced by the action of the pawl 36.

It is also to be noted that there is a lug 45 formed on that side face of the plate 30 opposite that face on which lug 40 is formed. This lug 45, as observed in Fig. 7, is in position to be engaged by the teeth of the ratchet 35, and when it is engaged by one of the teeth, as it is shown in Figs. 4 and 7, and considering that the latch gear is held by pawl 41 against reverse rotation, the stop 45 and ratchet 35 will operate to prevent the closing of the jaws together, thus holding the tongs in an open position that permits them to be lifted clear of a shaft or to be placed over a shaft.

With the understanding that with each closing action of the jaws from a fully open position, the tooth 38 of latch lever 36 causes the latch gear 33 to be advanced one sixth of a turn, it will be understood then that each alternate rotative advancement of the gear will cause a tooth of the ratchet 35 to be brought into position to lock with the lug 45 to hold the jaws open. The relative positions of parts of the automatic latch devices are diagrammatically shown in Figs. 12 to 16 for the operations beginning with the lowering of open tongs over a shaft, then the additional lowering of the tongs after the shaft has been deposited on a support to cause the complete opening of the jaw levers and release the latch devices; then, in succession, picking up the shaft, completely lowering the tongs after deposit of the shaft to lock the jaws open, and finally raising the open tongs from the shaft.

Explanation of the views of Figs. 12 to 16 is as follows:

First it will be stated that the jaw levers have three definite positions: first, the open position, at which the latch devices lock the jaws for application to or from a shaft, as seen in Figs. 12 and 16; second, a fully open position to which they can be moved by lowering the tongs down against the shaft while it is resting on a support, for example, as shown in Figs. 13 and 15; third, the closed position at which the jaws close about the object to lift it. All of these operations of the jaw levers are effected through the linkage connecting them with the suspending cable.

Now, starting with the parts as seen in Fig. 12, with the latch gear 33 in such position that a tooth of the ratchet 35 engages the stop 45 on plate 30, the jaws will be held in open position and may be lowered over the shaft S. Then, if the tongs are permitted to be lowered against the shaft to their fullest extent, the weight of the shaft to their fullest extent, the weight of lever arms and linkage swings the levers to their full open position of Fig. 13. This action causes the tooth 38 of latch pawl 36 to swing from the position shown in Fig. 12, up against a tooth of rachet 34 to rotate the ratchet one-sixth of a turn, and to cause the ratchet 35 to likewise rotate and the parts to assume the positions shown in Fig. 13, at which it is noted that teeth of ratchet 35 are in the clear of path of travel of the lug 45 on plate 30. Therefore, when the tongs are lifted to close them about the shaft, as they are shown in Fig. 14, the plate 30 swings the stop 45 down below the ratchet 35 and the yieldable pawl 36 ratchets over teeth of ratchet 34; the latch gear being held against reverse turning by pawl 41.

When the shaft, as held by the tongs in Fig. 14, is lowered onto a support and the jaw levers again actuated to their fully open position, as shown in Fig. 15, the relative upward swinging of plate 30 past the latch gear 33 causes the pawl tooth 38 to engage and again rotatably advance the latch gear 33 one-sixth of a turn and to position the lug 45 above the gear and to rotatably advance gear 35 into locking position, as seen in Fig. 15. Then when the tongs are lifted, a tooth of gear 35 engages the stop lug 45 on plate 30 and thus locks the jaws against closing and the tongs may be lifted clear of the shaft.

Such automatic locking mechanism may be employed on single sets of jaws or on double sets as here shown, and may be applied to tongs of various sizes and for various uses, but are especially useful when the part or object handled is red hot or where manual operation of latching devices is impractical or impossible.

Having thus described my invention, what I claim as new therein and desire to secure by Letters Patent is:

1. Tongs of the character described comprising crossed, pivotally joined levers having lower end jaws designed to cooperatively grip an object that is to be lifted and having connections at their upper ends with lifting means through which a lifting operation causes jaw closing forces to be applied to the levers, and whereby the jaws will be moved to a fully opened position when the tongs, with jaws in open position, are brought to rest upon an object and the weight of the tongs is unsustained by the lifting connections; and an automatic latching mechanism for retaining the jaws at a predetermined, partially open position for their application to an object; comprising a one direction latch gear mounted on the outer portion of one of the pivoted levers, a stop and a pawl mounted on the inner portion of the other lever; the pawl being operable with each complete opening of the jaws to rotatably advance the latch gear for the holding engagement therewith by the stop with alternate complete opening operations.

2. Tongs of the character described comprising crossed, pivotally joined levers having lower end jaws designed to cooperatively grip an object that is to be lifted and having connections at their upper ends with lifting means through which a lifting operation causes jaw closing forces to be applied to the levers, and a latching mechanism applied to the levers and adapted to be automatically set to retain the jaws at a predetermined open position for application to an object; said latching mechanism comprising a ratchet gear mounted on one lever to turn in one direction only, a stop on the other lever movable past the said ratchet gear with each adjustment of the jaws between closed and open positions, and other means on the last mentioned lever operable by the said adjustments of the jaws to advance the ratchet gear to successive positions for the passage of the stop device to permit the closing of the jaws, and for its engagement to hold the jaws in that open position required for their application to an object.

3. Lifting tongs of the character described comprising crossed pivotally joined levers having lower end jaws designed to cooperatively grip an object that is to be lifted and having connections at their upper ends with a lifting means through which lifting operations, causes jaw closing forces to be applied to the levers; an automatically operable latch mechanism associated with the levers and adapted to be set in position for limiting the closing action of the jaws beyond a predetermined open position required for the application of the jaws about an object; said mechanism comprising a latch gear wheel rotatably mounted on one of the jaw levers to turn in one direction only, and having two sets of ratchet teeth thereon, a stop lug and a pivoted pawl mounted on the other lever; said pawl being adapted to act against the teeth of one set to rotatably advance the latch gear with each adjustment of the jaws to a fully open relationship to thereby, on alternate advancements of the latch gear, locate a tooth of the other set of ratchet teeth in position for engagement by the stop to limit the closing adjustment of the jaws to that open position required for application of the jaws to an object.

4. Lifting tongs of the character described comprising crossed pivotally joined levers having lower end jaws designed to cooperatively grip an object that is to be lifted and having connections at their upper ends with a lifting means through which lifting operations cause jaw closing forces to be applied to the levers; and an automatically operable latch mechanism associated with the levers and adapted to be set in position for limiting the closing action of the jaws to a predetermined open position required for application of the jaws about an object and to be released therefrom; said mechanism comprising a latch gear wheel rotatably mounted on one lever and having two sets of ratchet teeth formed thereabout in opposite direction, a pawl on the lever yieldingly engaging the first set of ratchet teeth to prevent reverse rotation of the wheel, a stop and a pawl mounted on the other lever, and said pawl being operable against teeth of said ratchet incident to opening and closing action of the jaws to rotatably advance the latch gear through a definite interval and with alternate advance movements to cause teeth of the second set of ratchet teeth to be positioned for engagement by said stop to check the jaws against closing beyond that open position required for their application to an object.

5. Tongs as recited in claim 4 wherein one lever is bifurcated and the other lever is pivotally contained between the opposite sides of the bifurcated lever, and wherein the latch gear and its locking pawl is rotatably contained between the bifurcated parts of the lever; and said pawl and stop of the other lever are mounted on a plate that operates between the sides of the bifurcated lever.

JOHN A. GAMMEL.